US007168415B2

(12) United States Patent
Studebaker et al.

(10) Patent No.: US 7,168,415 B2
(45) Date of Patent: Jan. 30, 2007

(54) ELECTRONICALLY CONTROLLED SELECTIVE VALVE SYSTEM FOR FUEL LEVEL BALANCING AND ISOLATION OF DUAL TANK SYSTEMS FOR MOTOR VEHICLES (75) Inventors: Curt J. Studebaker, Columbia City, IN (US); Jeffrey R. Kelso, Fort Wayne, IN (US); Michael G. Jones, Continental, OH (US); Matthew D. Friede, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 147 days.

(21) Appl. No.: 10/974,350

(22) Filed: Oct. 27, 2004

(65) Prior Publication Data
US 2006/0086342 A1    Apr. 27, 2006

(51) Int. Cl.
*F02M 37/04*    (2006.01)
*F17D 1/00*    (2006.01)
(52) U.S. Cl. .................................. 123/509; 137/265
(58) Field of Classification Search ............... 123/509, 123/510, 511; 137/265, 266, 571, 395, 396; 280/834
See application file for complete search history.

(56) References Cited
U.S. PATENT DOCUMENTS
4,930,537 A    6/1990    Farmer

| 5,163,466 | A  |   | 11/1992 | Moody |
| 5,197,443 | A  | * | 3/1993  | Hodgkins ............... 123/514 |
| 5,551,664 | A  | * | 9/1996  | Boke ..................... 251/30.03 |
| 5,555,873 | A  |   | 9/1996  | Nolen |
| 5,960,809 | A  |   | 10/1999 | Keller |
| 6,371,151 | B1 | * | 4/2002  | Saylor ................... 137/119.08 |
| 6,382,225 | B1 | * | 5/2002  | Tipton .................... 137/1 |
| 6,799,562 | B2 |   | 10/2004 | Pratt et al. |
| 7,055,543 | B2 | * | 6/2006  | Erickson et al. .......... 137/255 |

\* cited by examiner

*Primary Examiner*—Thomas Moulis
(74) *Attorney, Agent, or Firm*—Jeffrey P. Calfa; Gerald W. Askew; Susan L. Lukasik (57) ABSTRACT A vehicle chassis with at least two fuel tanks with each of the fuel tanks having fuel level detector or sender. The level senders are engaged to an electronic controller. The individual tank draw lines from each tank come together at a control valve that has a single outlet that leads to an engine. The control valve can be open from one of the tanks at a time to the engine. An electronic controller takes the inputs from the fuel senders and compares levels between the tanks to control the valve. The system defaults or starts drawing from a primary tank and upon the level in the primary tank falling to a pre-specified amount below the level in a secondary tank, the electronic controller shifts the control valve to draw from the secondary tank or vice versa on a secondary tank level drop.

2 Claims, 7 Drawing Sheets

SKETCH #1a: ELECTRONICALLY CONTROLLED SELECTIVE SYSTEM

ELECTRONICALLY CONTROLLED SELECTIVE VALVE SYSTEM FOR FUEL LEVEL BALANCING AND ISOLATION OF DUAL TANK SYSTEMS FOR MOTOR VEHICLES

BACKGROUND OF INVENTION

Some motor vehicles such as medium or heavy-duty trucks have dual fuel tank systems. The traditional approach was for the engine to draw fuel from both of the tanks. One complexity to the system is that some engines such as diesel do not use all of the fuel that is provided to them. These vehicles have a return line, which returns the fuel to one or both of the tanks. When the fuel returns to one tank when there is a dual draw, imbalances result between the levels in the tanks. This is especially true where there is a single draw from one tank and a return to the other. Additionally, the returning fuel is generally heated when expelled from a warm engine. This results in warmed fuel being provided to one tank. Dual draw systems in the past used transfer pumps between the tanks; sets of draw and return valves; or equalization lines. This resulted in a number of parts and still there wasn't an easy way to isolate one tank in the event of a leak. This invention provides an electronically controlled selective valve system for fuel balancing and isolation of dual tank systems.

SUMMARY

The invention involves a vehicle chassis with at least two fuel tanks. There is an engine engaged to a chassis structural member. Each of the fuel tanks has fuel level detector or sender. The level senders are engaged to an electronic controller. Each of the tanks has a draw or supply line from it. The individual tank draw lines come together at a draw control valve that has a single outlet. That single outlet leads to the single fuel supply line to the engine. The control valve can be open from one of the tanks to the engine or from the other tank to the engine. The control valve is controlled to be open to a particular tank based upon control signals from the electronic controller. One of the tanks is designated as the primary tank and the other as the secondary tank, or first tank and second tank as the case may be. The controller takes the inputs from the fuel senders and compares levels between the tanks. The system defaults or starts drawing from the primary tank and upon the level in the primary tank falling to a pre-specified amount below the level in the secondary tank, the electronic controller shifts the control valve to draw from the secondary tank. As the level in the secondary tank falls to a pre-specified amount below the level in the primary tank, the electronic controller shifts the control valve draw from the primary tank. This process is repeated with the result being balanced levels between the tanks without the need to siphon or pump from one tank to the other. There may be a common return to tank line or there also may be a return control valve that splits and allows return fuel to be directed to one tank. An electronic controller also controls the return control valve. Having a supply control valve and a return control valve allows for remote isolation of one of the fuel tanks. The control valves may be electronic, solenoid, hydraulic, or air operated so long as there are intakes from each tank and a common line going to the engine.

DRAWINGS

Other objects and advantages of the invention will become more apparent upon perusal of the detailed description thereof and upon inspection of the drawings, in which.

DESCRIPTION OF INVENTION

Figure 1:
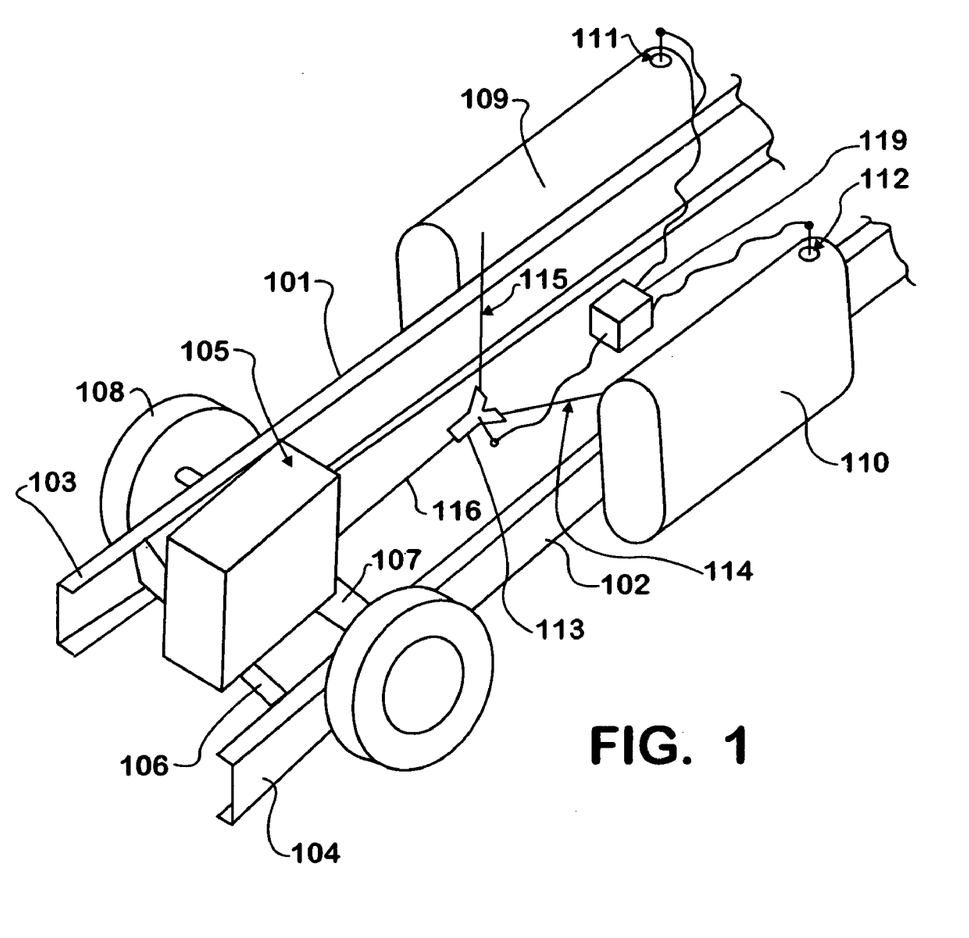
FIG. 1 is a vehicle chassis that uses an electronically controlled selective valve system for fuel balancing and isolation of dual tank systems and is made in accordance with this invention.

A vehicle 101 with an engine 105 may have a chassis 102 comprised of left and right frame members 103 and 104. Such a vehicle is shown in FIG. 1. The vehicle 101 may contain a cross frame structure member 106 between the frame members 103 and 104. The chassis 102 contains axles 107 with wheels 108. The engine 105 may be engaged to the cross frame member 106. The engine 105 consumes fuel from two fuel tanks, 109 and 110 shown as right and left fuel tanks 109 and 110, shown engaged to the frame members 103 and 104. This document also refers to these two tanks as primary and secondary or first and second as the case may be. The physical location of the tanks 109 and 110 is not important to this invention, just that there are at least two tanks 109 and 110 engaged to the vehicle 101. The left fuel tank 110 contains a fuel level sender or detector 112. The right fuel tank 109 contains a fuel level sender or detector 111. There is a fuel supply or draw line 114 engaged to the left fuel tank 110. The left fuel tank draw line 114 leads to one of the inlets of a control valve 113. There is a fuel supply or draw line 115 engaged to right fuel tank 109. The right fuel tank draw line 115 leads to a second inlet of the control valve 113. A common draw line 116 is engaged to an outlet of the control valve 113 leads to the engine 105. The control valve 113 can be controlled to be open from either right fuel tank draw line 115 to the common draw line 116 or the control valve 113 can be open from the left fuel tank draw line 114 to the common draw line 116. When the control valve 113 is open from one fuel tank draw line, it is closed to the other fuel tank draw line. The control valve 113 may be electronic, solenoid, hydraulic, or air operated so long as there are intakes from each tank and a common line going to the engine 105. An electronic controller 119 of the vehicle controls the control valve 113. In one embodiment, the control valve 113 is a GT Development Corporation fuel selector valve (FSV) that is designed for use with a Voss 246 series NS12 quick-connect fitting system.

Figure 5:
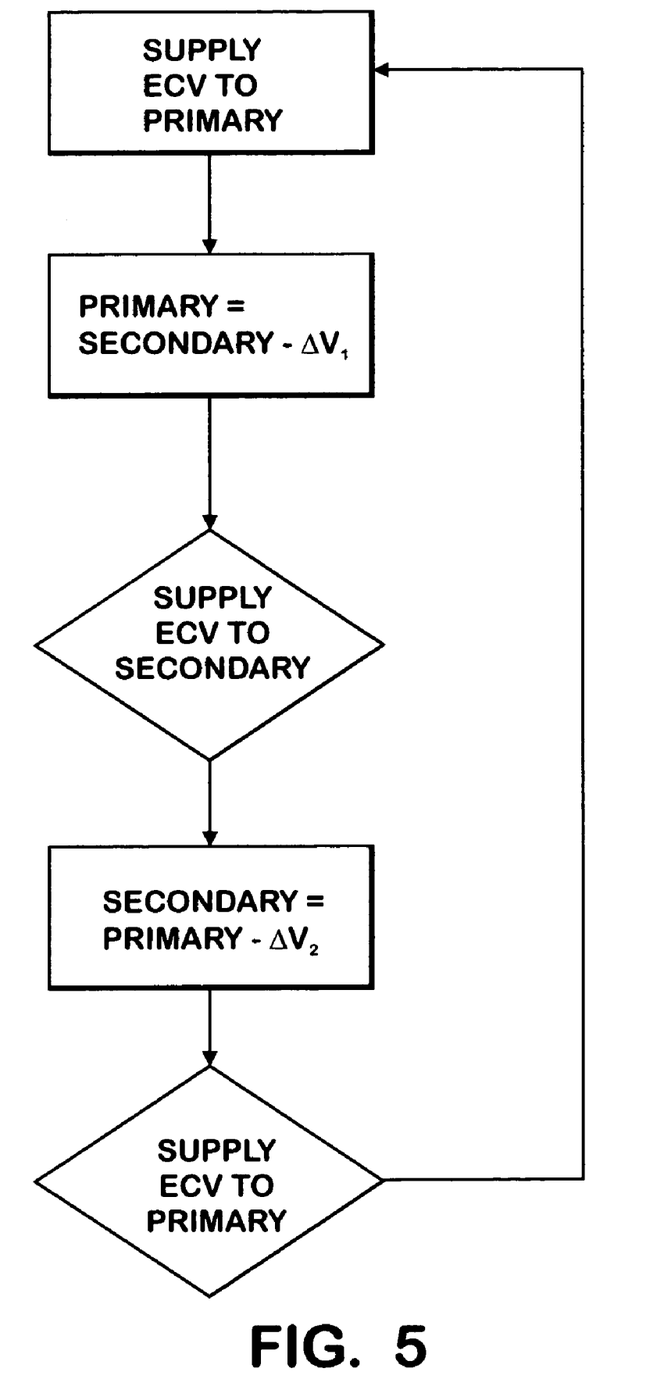
FIG. 5 shows the control scheme of the embodiment shown in FIG. 2.

The electronic controller 119 contains a processor unit that is electrically engaged to receive tank level indications from both of the fuel level sender or detectors 111 and 112. The electronic controller 119 may be programmed to control the control valve 113 to direct it to shift between being open to one of the fuel tank draw lines 114 or 115 to the common draw line 116. The control valve 113 is controlled to be open to a particular tank based upon control signals from the electronic controller 119. One of the tanks is designated as the primary tank and the other as the secondary tank. Either the left or right fuel tanks 109 or 110 can be the primary tank and as mentioned above there is no requirement that the tanks be in any specific location on the vehicle, just that there be more than one tank. The controller 119 takes the inputs from the fuel senders 111 and 112, and compares levels between the tanks 109 and 110. The system defaults or starts drawing from the primary tank and upon the level in the primary tank falling to a pre-specified amount or differential volume, Delta $V_1$ below the level in the secondary tank, the electronic controller 119 shifts the control valve 113 to draw from the secondary tank. This programmed logic is shown in FIG. 5. The pre-specified amount Delta $V_1$ may be an amount large enough to allow for inaccuracies in the fuel level senders but small enough to keep the tank levels close. As the level in the secondary tank falls to a second pre-specified amount or differential volume, Delta $V_2$ below the level in the primary tank, the electronic controller shifts the control valve draw to the primary tank. This process is repeated with the result being balanced levels between the tanks without the need to siphon or pump from one tank to the other. The Delta $V_2$ does not need be the same as the Delta $V_1$. In one embodiment the Delta Vs are 10 to 20% of tank volume.

Figure 2:
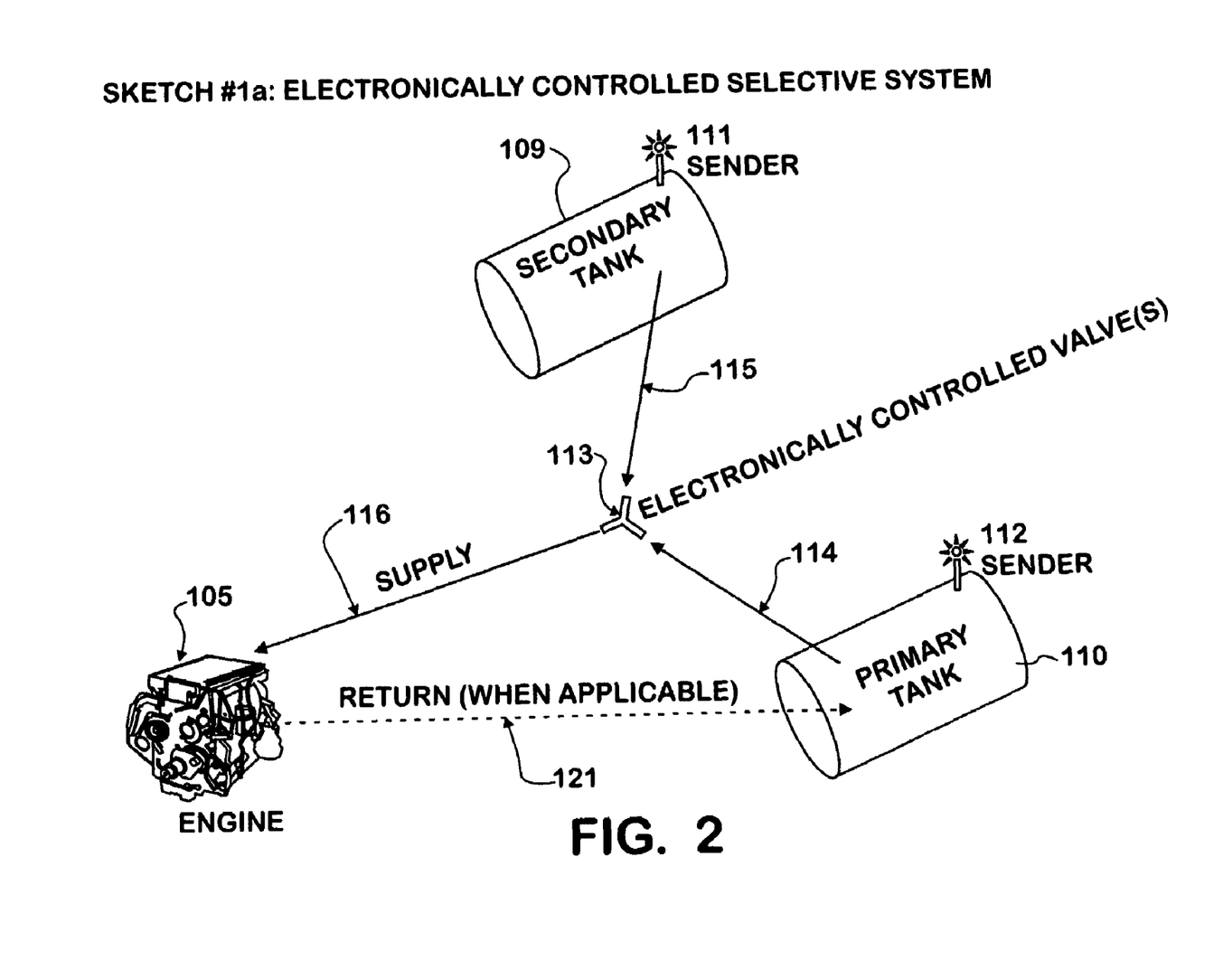
FIG. 2 is the system of the chassis of FIG. 1 without the rest of the chassis.
Figure 3:
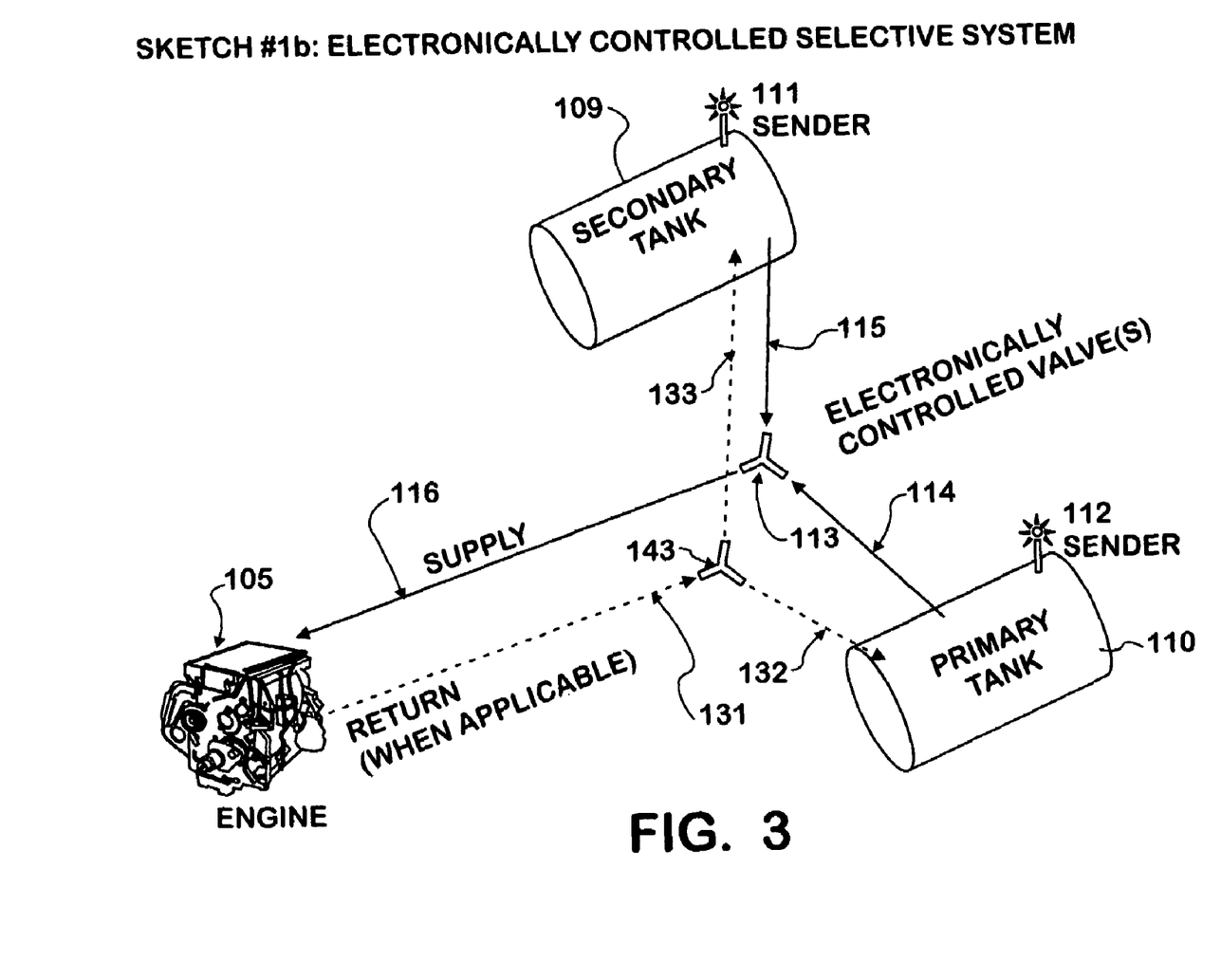
FIG. 3 is an alternate embodiment of the electronically controlled selective valve system for fuel balancing and isolation of dual tank systems.
Figure 6:
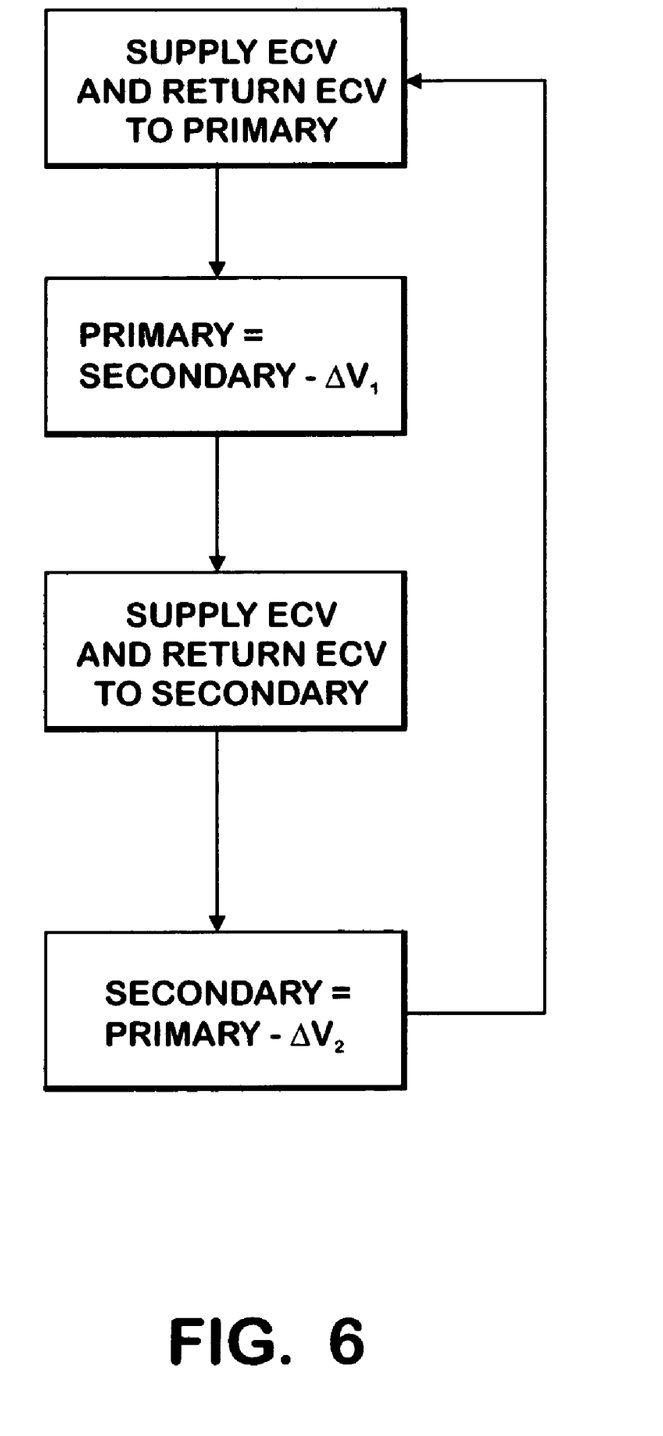
FIG. 6 shows one control scheme for the embodiment shown in FIG. 3.

There may be a common return to tank line 121 as shown in FIG. 2. In that embodiment, the fuel always returns to the same tank. Alternatively as shown in FIG. 3, there also may be a return control valve 143 that splits and allows return fuel to be directed to one tank. There would be common return 131 from the engine 105 to the return control valve 143. There are individual tank return lines 132 and 133 from the outlets of the return control valve 143 to the individual tanks 110 and 109 respectively. An electronic controller 119 also controls the return control valve 143. FIG. 6 shows the control logic for a dual tank fuel delivery system with both a supply control valve 113 and a return control valve 143. The logic is similar to FIG. 4 as described above except that both the supply and return control valves shift to a tank upon the other tank falling a pre-specified amount Delta V below the tank that the valves are aligned to.

Figure 4:
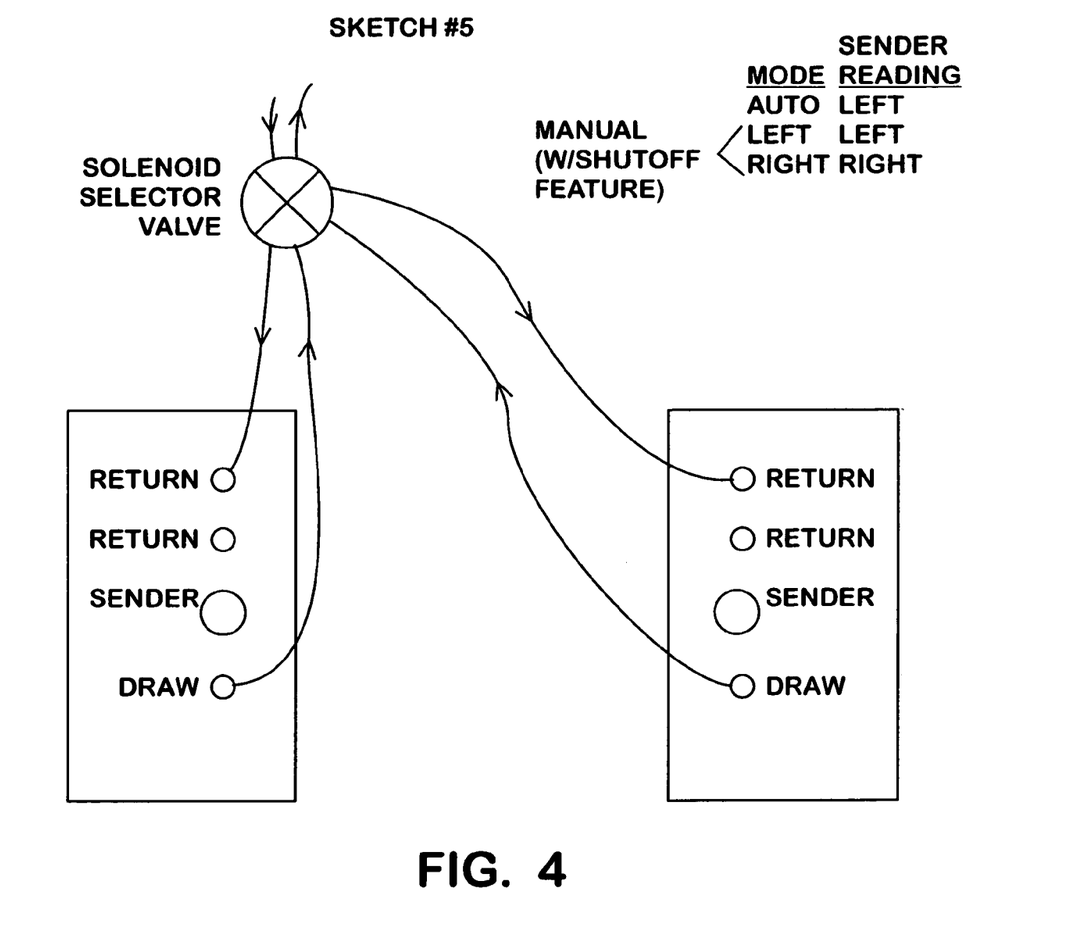
FIG. 4 is the control scheme for one variation of the embodiment shown in FIG. 3.
Figure 7:
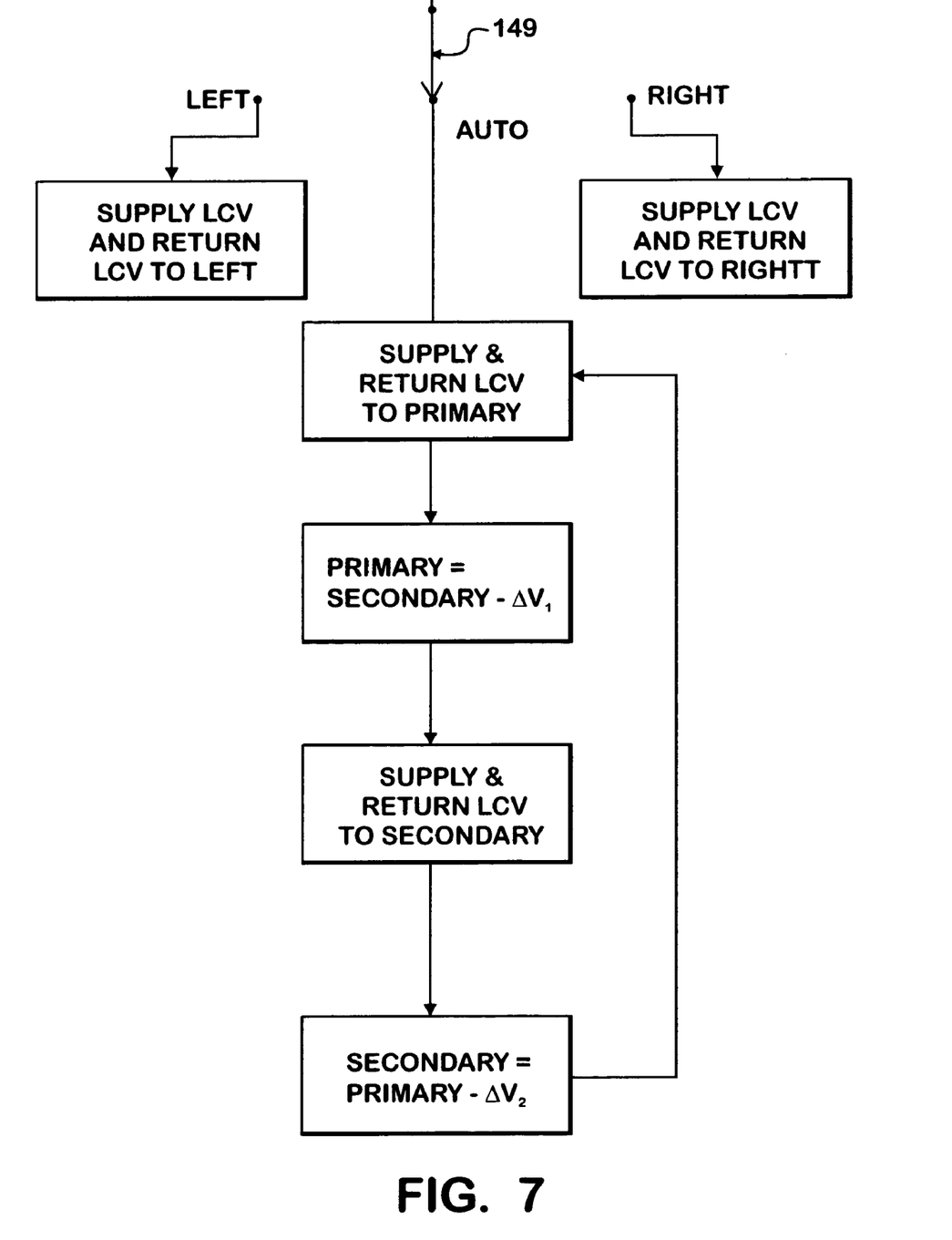
FIG. 7 shows an alternative control scheme for the embodiment shown in FIG. 3.

Having a supply control valve 113 and a return control valve 143 allows for remote isolation of one of the fuel tanks as the control valves are opened to another of the tanks. FIGS. 4 and 7 show this functionality pictorially. The driver of the vehicle has a selector switch with at least 3 positions: AUTO; LEFT or first tank position (indicating which tank); and RIGHT or second tank position. When the selector switch is in AUTO, the system operates as the logic in FIG. 6 with the shifting between the tanks depending on the delta fuel level between them. When the selector switch is moved to LEFT, the supply control valve 113 and the return control valve 143 shift draw fuel from and return fuel to the left fuel tank 110. The right fuel tank 109 is now isolated. This would be useful if maintenance is needed on the right fuel tank or if it were leaking. When the selector switch is moved to RIGHT, the supply control valve 113 and the return control valve 143 shift draw fuel from and return fuel to the right fuel tank 109. The left fuel tank 110 is now isolated.

Note that this description deals with two tanks although; this invention can be made with more than two tanks. The control valve in that design would not be a 3-way valve. The control valve would have more ports on the inlet or outlet depending on whether it was a draw control valve or a return control valve. For instance in a three tank system, the draw control valves would have three inlets and one outlet.

As described above, the vehicle and associated fuel delivery system and components of this invention provide a number of advantages, some of which have been described above and others of which are inherent in the invention. Also modifications may be proposed to the vehicle and associated fuel delivery system and components of this invention without departing from the teachings herein.

We claim:

1. A mobile vehicle, comprising:
   a chassis comprised of frame members with an engine engaged for driving the vehicle;
   at least two fuel tanks, a first tank and a second tank, engaged to said chassis frame members;
   each said fuel tank have a fuel level sender;
   said fuel level senders electrically engaged to a vehicle electronic controller to provide fuel tank level indication to said electronic controller;
   a draw line from said first tank engaged to a first inlet to a draw control valve;
   a draw line from said second tank engaged to a second inlet to said draw control valve;
   an outlet from said draw control valve engaged to supply fuel to said engine;
   a common return line from said engine being engaged to an inlet of a return control valve;
   a first tank return line being engaged from a first outlet of said return control valve to said first tank;
   a second tank return line being engaged from a second outlet of said return control valve to said second tank;
   said electronic controller engaged to control said draw control valve and said return control valve such that when said first inlet of said draw control valve is open from said first tank and said return control valve is open to return fuel to said first tank, said second inlet of said draw control valve is closed from said second tank and said return control valve is closed to said second tank;
   said electronic controller engaged to control said draw control valve and said return control valve such that when said second inlet of said draw control valve is open from said second tank and said return control valve is open to return fuel to said second tank, said first inlet of said draw control valve is closed from said first tank and said return control valve is closed to said first tank;
   a selector switch with three positions, an AUTO, a first tank position, and a second tank position;
   said electronic controller programming comprising, when said selector switch is in AUTO, the steps of:
      initially aligning said draw control valve draw from said first tank;
      shifting said draw control valve to draw from said second tank when level in said first tank falls a specified differential tank volume below said level in said second tank;
      shifting said draw control valve to draw from said first tank when level in said second tank fails a specified differential tank volume below said level in said first tank; and
      repeating said steps of alternating drawing between tanks as volume falls to specified volumes below the other of said tanks;
   said electronic controller programming comprising, when said selector switch is in a first tank position, the steps of:

opening said draw control valve to draw from said first tank and opening said draw return valve to allow fuel to return to said first tank; and isolating said second tank by closing said draw and return control valves to said second tank;

said electronic controller programming comprising, when said selector switch is in a second tank position, the steps of:

opening said draw control valve to draw from said second tank and opening said draw return valve to allow fuel to return to said second tank;

isolating said first tank by closing said draw and return control valves to first second tank.

2. A fuel distribution system for a mobile vehicle, comprising:

at least two fuel tanks, a first tank and a second tank, engaged to said chassis frame members;

each said fuel tank have a fuel level sender;

said fuel level senders electrically engaged to an electronic controller to provide fuel tank level indication to said electronic controller;

a draw line from said first tank engaged to a first inlet to a draw control valve;

a draw line from said second tank engaged to a second inlet to said draw control valve;

an outlet from said draw control valve engaged to supply fuel to said engine;

a common return line from said engine being engaged to an inlet of a return control valve;

a first tank return line being engaged from a first outlet of said return control valve to said first tank a second tank return line being engaged from a second outlet of said return control valve to said second tank;

said electronic controller engaged to control said draw control valve and said return control valve such that when said first inlet of said draw control valve is open from said first tank and return control valve is open to return fuel to said first tank, said second inlet of said draw control valve is closed from said second tank and said return control valve is closed to said second tank;

said electronic controller engaged to control said draw control valve and said return control valve such that when said second inlet of said draw control valve is open from said second tank and return control valve is open to return fuel to said second tank, said first inlet of said draw control valve is closed from said first tank and said return control valve is closed to said first tank;

a selector switch with three positions, an AUTO, a first tank position, and a second tank position;

said electronic controller programming comprising, when said selector switch is in AUTO, the steps of:

initially aligning said draw control valve draw from said first tank;

shifting said draw control valve to draw from said second tank when level in said first tank falls a specified differential tank volume below said level in said second tank;

shifting said draw control valve to draw from said first tank when level in said second tank falls a specified differential tank volume below said level in said first tank; and alternating drawing between tanks as volume falls to specified volumes below the other of said tanks;

said electronic controller programming comprising, when said selector switch is in a first tank position, the steps of:

opening said draw control valve to draw from said first tank and opening said draw return valve to allow fuel to return to said first tank; and isolating said second tank;

said electronic controller programming comprising, when said selector switch is in a second tank position, the steps of:

opening said draw control valve to draw from said second tank and opening said draw return valve to allow fuel to return to said second tank;

isolating said first tank.

* * * * *